US011743062B2

(12) United States Patent
Thompson et al.

(10) Patent No.: US 11,743,062 B2
(45) Date of Patent: Aug. 29, 2023

(54) METHOD AND SYSTEM FOR MULTI-OPERATOR ANCHOR SERVICE

(71) Applicant: Verizon Patent and Licensing Inc., Basking Ridge, NJ (US)

(72) Inventors: Carlo Thompson, Glen Gardner, NJ (US); Adeniyi O. Soremi, Hillside, NJ (US); Chris Bramble, Morristown, NJ (US); Alexander C. Smith, Bronx, NY (US); Mirwais Popal, Leonia, NJ (US); Michael Vazquez, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 20 days.

(21) Appl. No.: 17/193,271

(22) Filed: Mar. 5, 2021

(65) Prior Publication Data
US 2022/0286307 A1 Sep. 8, 2022

(51) Int. Cl.
*H04W 28/08* (2023.01)
*H04W 28/02* (2009.01)
*H04L 12/14* (2006.01)
*H04W 40/36* (2009.01)

(52) U.S. Cl.
CPC ..... *H04L 12/1407* (2013.01); *H04W 28/0226* (2013.01); *H04W 28/0967* (2020.05); *H04W 40/36* (2013.01)

(58) Field of Classification Search
CPC .................................................. H04W 40/36
See application file for complete search history.

(56) References Cited

U.S. PATENT DOCUMENTS

| | | | |
|---|---|---|---|
| 2009/0154415 A1* | 6/2009 | Park | H04W 72/10 370/329 |
| 2010/0216478 A1* | 8/2010 | Buddhikot | H04W 16/14 455/450 |
| 2013/0225123 A1* | 8/2013 | Adjakple | H04W 4/24 455/406 |
| 2014/0056290 A1* | 2/2014 | Pazhyannur | H04W 80/045 370/338 |
| 2014/0153542 A1* | 6/2014 | Diachina | H04W 36/14 370/331 |
| 2014/0213258 A1* | 7/2014 | Dahlen | H04W 36/0083 455/436 |
| 2015/0312834 A1* | 10/2015 | Patil | H04W 36/0022 370/331 |
| 2017/0332274 A1* | 11/2017 | Link, II | H04W 28/0268 |
| 2017/0347272 A1* | 11/2017 | Ahmavaara | H04W 48/12 |
| 2018/0192390 A1* | 7/2018 | Li | H04W 60/04 |
| 2018/0220276 A1* | 8/2018 | Senarath | H04M 15/8016 |

(Continued)

FOREIGN PATENT DOCUMENTS

| | | | | |
|---|---|---|---|---|
| EP | 2477427 A1 * | 7/2012 | | H04L 12/1446 |
| EP | 3001620 A1 * | 3/2016 | | H04L 12/6418 |

*Primary Examiner* — Nathan S Taylor (57) ABSTRACT

A method, a device, and a non-transitory storage medium are described in which a multi-operator anchor service is provided. A multi-operator anchor device may provide a centralized user plane anchor for traffic of end devices associated with multiple networks and operators. The multi-operator anchor device may provide virtual routing and forwarding to isolate traffic among the networks and operators. The multi-operator anchor device may provide a charging service for traffic and a handover service based on end device mobility.

20 Claims, 9 Drawing Sheets

(56) References Cited

U.S. PATENT DOCUMENTS

| | | | | |
|---|---|---|---|---|
| 2018/0262913 | A1* | 9/2018 | Ravishankar | H04W 76/11 |
| 2018/0302877 | A1* | 10/2018 | Bosch | H04W 84/00 |
| 2018/0309510 | A1* | 10/2018 | Trojer | H04B 7/2606 |
| 2019/0007500 | A1* | 1/2019 | Kim | H04L 67/141 |
| 2019/0140933 | A1* | 5/2019 | Guim Bernat | H04L 47/2408 |
| 2019/0141536 | A1* | 5/2019 | Bachmutsky | H04L 67/10 |
| 2020/0007414 | A1* | 1/2020 | Smith | G06Q 30/08 |
| 2020/0178198 | A1* | 6/2020 | Ding | H04W 60/04 |
| 2020/0195495 | A1* | 6/2020 | Parker | H04L 41/5051 |
| 2020/0267512 | A1* | 8/2020 | Pfadler | H04W 88/04 |
| 2020/0267518 | A1* | 8/2020 | Sabella | H04W 12/06 |
| 2020/0359269 | A1* | 11/2020 | Qiao | H04L 47/20 |
| 2020/0404069 | A1* | 12/2020 | Li | H04W 8/24 |
| 2021/0136676 | A1* | 5/2021 | Muller | H04W 48/18 |
| 2022/0038289 | A1* | 2/2022 | Huang | G06F 16/27 |
| 2022/0086864 | A1* | 3/2022 | Sabella | H04L 41/0894 |
| 2022/0103614 | A1* | 3/2022 | Ganguli | H04L 67/10 |
| 2022/0159650 | A1* | 5/2022 | Li | H04W 72/0453 |
| 2022/0338279 | A1* | 10/2022 | Sahin | H04W 4/023 |

* cited by examiner

METHOD AND SYSTEM FOR MULTI-OPERATOR ANCHOR SERVICE

BACKGROUND

Development and design of networks present certain challenges from a network-side perspective and an end device perspective. For example, Centralized Radio Access Network (C-RAN), Open Radio Access Network (O-RAN), split RAN, stand-alone (SA) and non-stand-alone (NSA) architectures, and edge computing have been proposed to satisfy the increasing complexity, densification, and demands of end device application services of a future generation network.

DETAILED DESCRIPTION

The following detailed description refers to the accompanying drawings. The same reference numbers in different drawings may identify the same or similar elements. Also, the following detailed description does not limit the invention.

In order to enhance performance, among other things, multi-access edge computing (MEC) (also known as mobile edge computing (MEC)) is being explored in which core network capabilities (e.g., computational, storage, communication links, etc.) are situated at the network edge. MEC networks or other types of end device application or service layer networks (referred to as "application service layer network") provide an application and/or a service (referred to as an "application service"). The application service may include a monolithic application, a microservice, or another type of configurable architecture of an application service.

With the advent of Fifth Generation (5G) networks and beyond, operators and/or other entities may wish to deploy an anchor node to permit local edge computing, such as a MEC network or another type of application layer network to communicate with a RAN. With limited space to add equipment and complexities associated with how a single data network communicates with multiple operator core networks, there are challenges in creating these connections efficiently.

According to exemplary embodiments, a multi-operator anchor service is described. According to an exemplary embodiment, the multi-operator anchor service may be implemented by a core network device. For example, the core network device may include a user plane function (UPF), a packet date network gateway (PGW), and/or another type of Internet Protocol (IP) or Layer 3 anchor device, as described herein. According to an exemplary embodiment, the core network device may provide connectivity between end devices and application service layer networks of a multi-operator environment. According to an exemplary embodiment, the core network device may monitor and generate charging information pertaining to application service sessions and users associated with different network operators.

In view of the foregoing, the multi-operator anchor service may simplify the development and gain efficiencies in deployments to access application services for users in a multi-operator environment. For example, the core network device that provides the multi-operator anchor service may eliminate each operator deploying their own anchor device and connectivity thereof with radio access networks and other networks, such as core networks and application layer networks.

Figure 1:
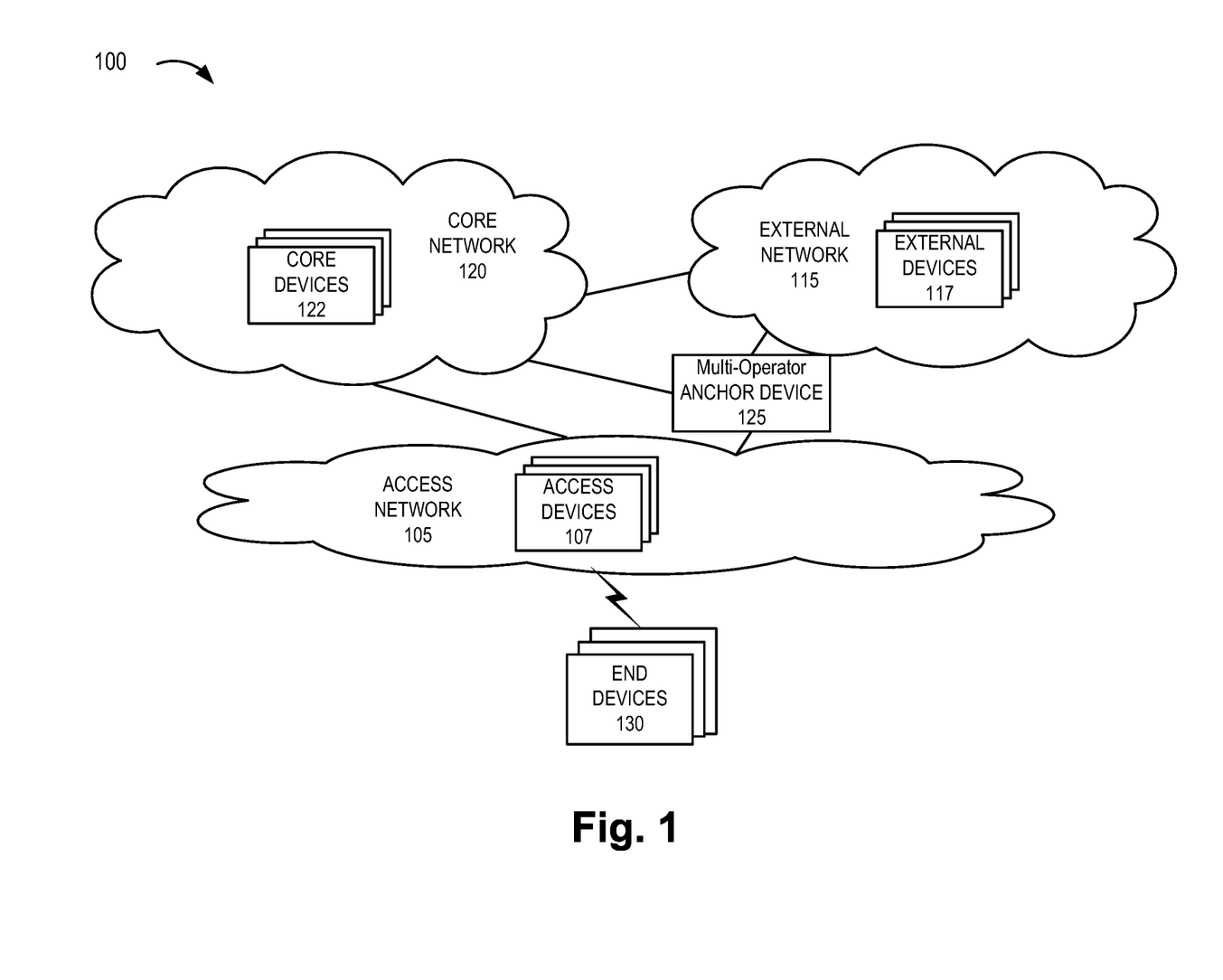
FIG. 1 is a diagram illustrating an exemplary environment in which an exemplary embodiment of a multi-operator anchor service may be implemented.

FIG. 1 is a diagram illustrating an exemplary environment 100 in which an exemplary embodiment of the multi-operator anchor service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes a multi-operator (MO) anchor device 125 and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may provide the multi-operator anchor service, as described herein.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, NSA, SA, etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), a radio unit (RU), a CU, a CU control plane (CU CP), a CU user plane (CU UP), a DU, a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (MC).

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

According to some exemplary embodiments, access device 107 may include logic that provides the multi-operator anchor service. For example, access device 107 may make determinations for when a communication may be routed to core network 120 associated with one of the multiple operators or multi-operator anchor device 125. According to some exemplary embodiments, access device 107 may make these determinations based on a type of procedure associated with a message (e.g., an attachment procedure, a handover procedure, a registration procedure, or another type of network procedure) and/or a type of application service, such as a category of an application service (e.g., an automation application service, an IoT application service, a real-time (RT) application service, or another type of application service category), a sub-category of an application service (e.g., industrial automation, consumer IoT (CIoT) application service, or another type of sub-category of an application service), a performance metric (e.g., minimum, maximum, guaranteed, and/or other quantifier pertaining to latency, throughput, bitrate, error rate, and/or another type of performance indicator), and/or another criterion that may indicate or identify a type of application service.

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, a cloud network, or another type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include an NGC or a 5G network, an EPC of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

Multi-operator anchor device 125 may include a network device that provides the multi-operator anchor service, as described herein. Multi-operator anchor device 125 provides a user plane anchor for data sessions between end devices 130 and external network 115/external devices 117 via a multi-operator network, such as access network 105 and/or core network 120/core devices 122. According to an exemplary embodiment, the multi-operator anchor service may provide a registration and attachment service, as described herein. For example, end devices 130 may register and attach to core networks 120 associated with different network operators via multi-operator anchor device 125. According to an exemplary embodiment, the multi-operator anchor service may include a virtual routing and forwarding (VRF) service. For example, multi-operator anchor device 125 may provide virtual routing and forwarding in support of the multi-operator network and messages exchanged among end devices 130, access networks 105, core networks 120, and external networks 115. According to an exemplary embodiment, the multi-operator anchor service includes a charging service for data sessions, as described herein. For example, multi-operator anchor device 125 may obtain policies and/or rules pertaining to charging and enforcement from core devices 122 associated with different network operators. According to an exemplary embodiment, the multi-operator anchor service may include a handover service, as described herein. For example, multi-operator anchor device 125 may release and handover user plane sessions due to mobility of end devices 130 and/or based on type of application services and/or external network 115. Multi-operator anchor device 125 may communicate with other networks and devices via a user plane, a control plane, and/or other planes of communication.

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

According to some exemplary embodiments, end device 130 may include logic that provides the multi-operator anchor service. For example, end device 130 may make determinations as to the transmission of messages to a core network 120 associated with one of the multiple operators or multi-operator anchor device 125. According to some exemplary embodiments, end device 130 may make these determinations based on a type of procedure associated with a message (e.g., an attachment procedure, a handover procedure, a registration procedure, or another type of network procedure) and/or a type of application service being requested, as described herein.

Figure 2:
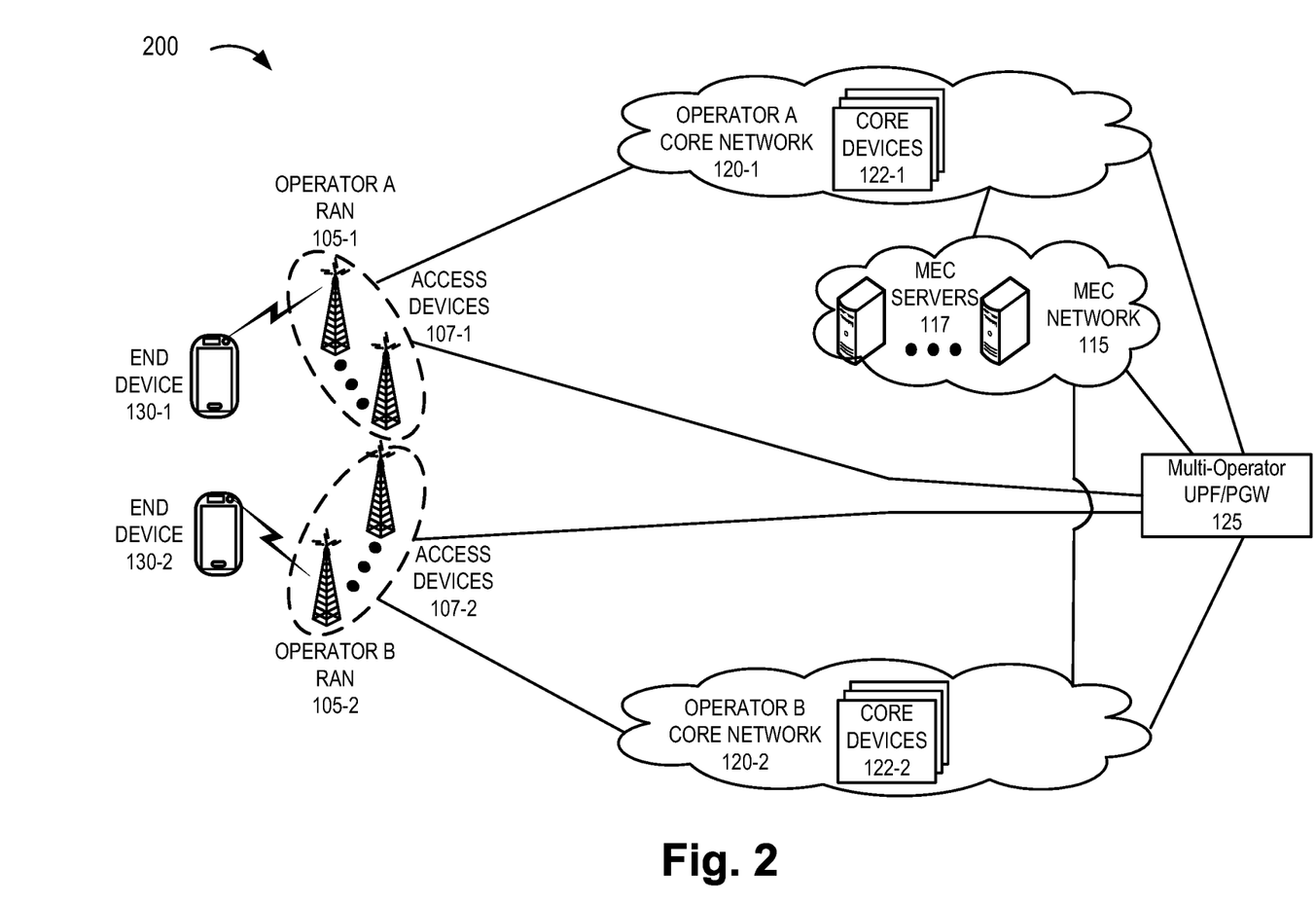
FIG. 2 is a diagram illustrating another exemplary environment in which an exemplary embodiment of the multi-operator anchor service may be implemented.

FIG. 2 is a diagram illustrating another exemplary environment 200 in which an exemplary embodiment of the multi-operator anchor service may be implemented. Environment 200 may include a multi-operator environment that includes multiple operator networks.

As illustrated, environment 200 includes end devices 130-1 and 130-2, an operator A RAN 105-1 including access devices 107-1 and an operator B RAN 105-2 including access devices 107-2. As further illustrated, environment 200 includes a MEC network 115 including MEC servers 117, an operator A core network 120-1 including core devices 122-1, an operator B core network 120-2 including core devices 122-2, and an MO anchor device 125.

The number and arrangement of networks and network devices illustrated and described are exemplary. Additionally, the number, arrangement, and type of connections between the devices and between networks are exemplary. Operator A RAN 105-1 and operator B RAN 105-2 may each include an exemplary implementation of access network 105 and access devices 107, as described herein, and be associated with a distinct network operator (e.g., wireless network operator). Similarly, operator A core network 120-1 and operator B core network 120-2 may each include an exemplary implementation of core network 120 and core devices 122, as described herein, and be associated with a distinct network operator or other type of entity. MEC network 115 and MEC servers 117 are exemplary implementations of external network 115 and external devices 117, as describe herein. According to an exemplary embodiment, multi-operator anchor device 125 may implemented be as a UPF and/or a PGW that provides a multi-operator anchor service (illustrated as multi-operator UPF/PGW 125).

Figure 3A:
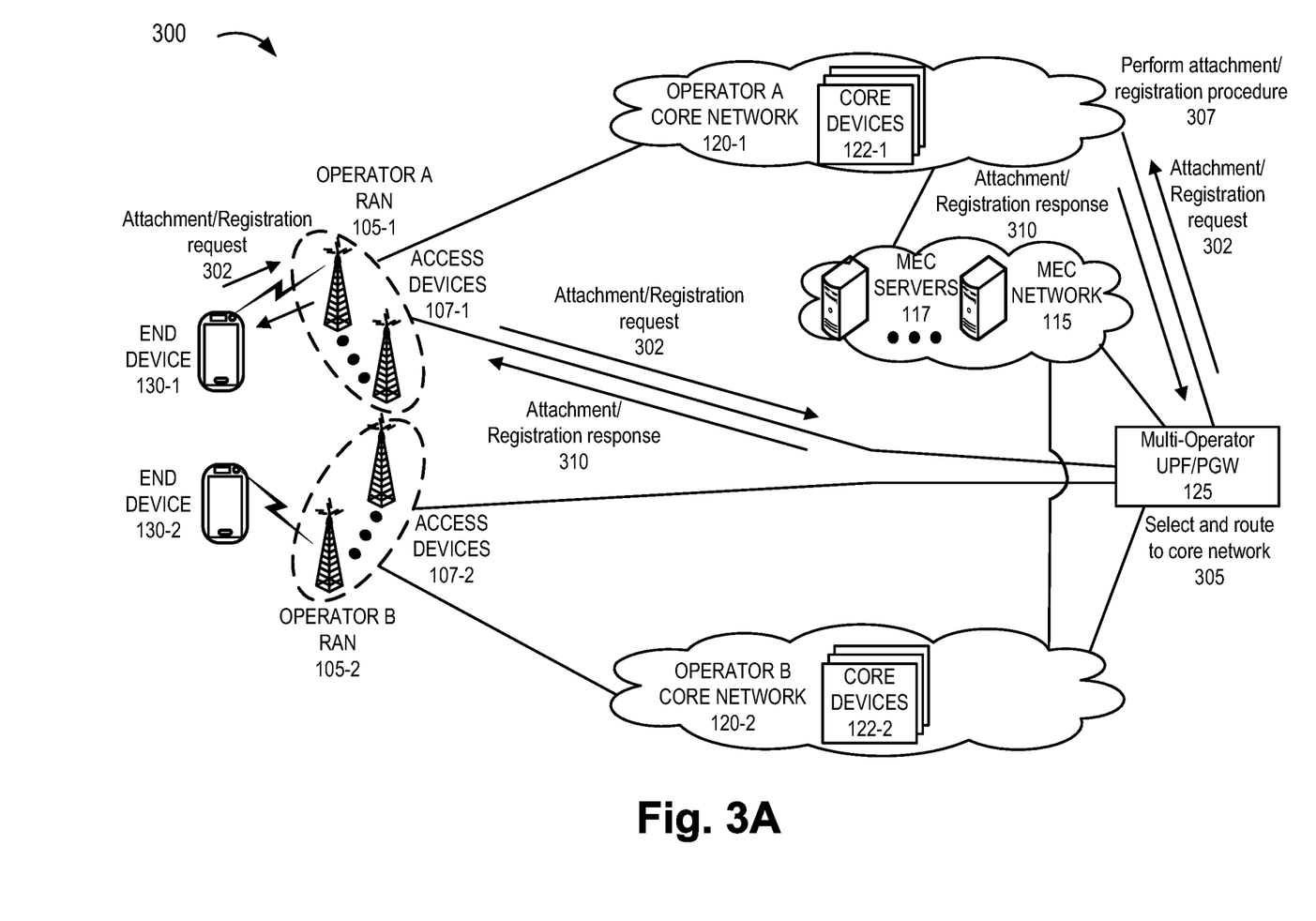
FIGS. 3A-3E are diagrams illustrating exemplary processes of exemplary embodiments of the multi-operator anchor service.

FIGS. 3A-3E are diagrams illustrating exemplary processes of exemplary embodiments of the multi-operator anchor service, as described herein. Referring to FIG. 3A, assume end device 130-1 invokes an attachment and/or registration procedure with core network 120-1 via multi-operator UPF/PGW 125. For example, end device 130-1 may transmit an attachment/registration request 302 to multi-operator UPF/PGW 125. In response to receiving the request, multi-operator UPF/PGW 125 may provide a registration and attachment service in conjunction with a virtual routing and forwarding service of the multi-operator anchor service. For example, multi-operator UPF/PGW 125 may read and interpret the message as an attachment/registration request relative to core network 120.

Based on the interpretation of attachment/registration request 302, for example, multi-operator UPF/PGW 125 may select and route attachment/registration request 302 to the appropriate core network 120 among multiple operator core networks (e.g., 120-1, 120-2, etc.). According to an exemplary embodiment, multi-operator UPF/PGW 125 may select the appropriate core network 120 based on an identifier of end device 130 (e.g., a Mobile Station International Subscriber Directory Number (MSISDN), an International Mobile Subscriber Identity (IMSI), a UE identifier, a Subscription Permanent Identifier (SUPI), an International Mobile Equipment Identity (IMEI), a Mobile Equipment Identifier (MEID), a permanent equipment identifier (PEI), a globally unique identifier (GUI), a temporary identifier, or another suitable user and/or end device identifier), a Public Land Mobile Network (PLMN) identifier, a closed subscriber group identifier, and/or a network address (e.g., a Medium Access Control (MAC) address, an Internet Protocol (IP) address, or another type of network address). Additionally, or alternatively, multi-operator UPF/PGW 125 may select the appropriate core network 120 based on a communication link, a communication interface, and/or a port via which attachment/registration request 302 was received. Additionally, or alternatively, multi-operator UPF/PGW 125 may select the appropriate core network 120 based on an identifier and/or a network address associated with access device 105, for example. In this way, multi-operator UPF/PGW 125 may correlate an identifier or another type of data, as described herein, to the appropriate core network 120.

Multi-operator UPF/PGW 125 may include logic that provides routing in a multi-operator environment. For example, multi-operator UPF/PGW 125 may provide virtual routing and forwarding such that traffic of each operator's network may be separated and isolated. Multi-operator UPF/PGW 125 may include one or multiple logical and/or physical interfaces and multiple routing instances which may operate separately. For example, as illustrated, based on the selection, multi-operator UPF/PGW 125 may route 305 attachment/registration request 302 to operator A core network 120-1. Operator A core network 120-1 may perform an attachment/registration procedure 307. As part of the procedure, operator A core network 120-1 may transmit an attachment/registration response 310 to end device 130-1 via multi-operator UPF/PGW 125. According to some exemplary embodiments, although not illustrated, operator A core network 120-1 may provide policy and charging rules to multi-operator UPF/PGW 125 that pertain to end device 130-1.

Figure 3B:
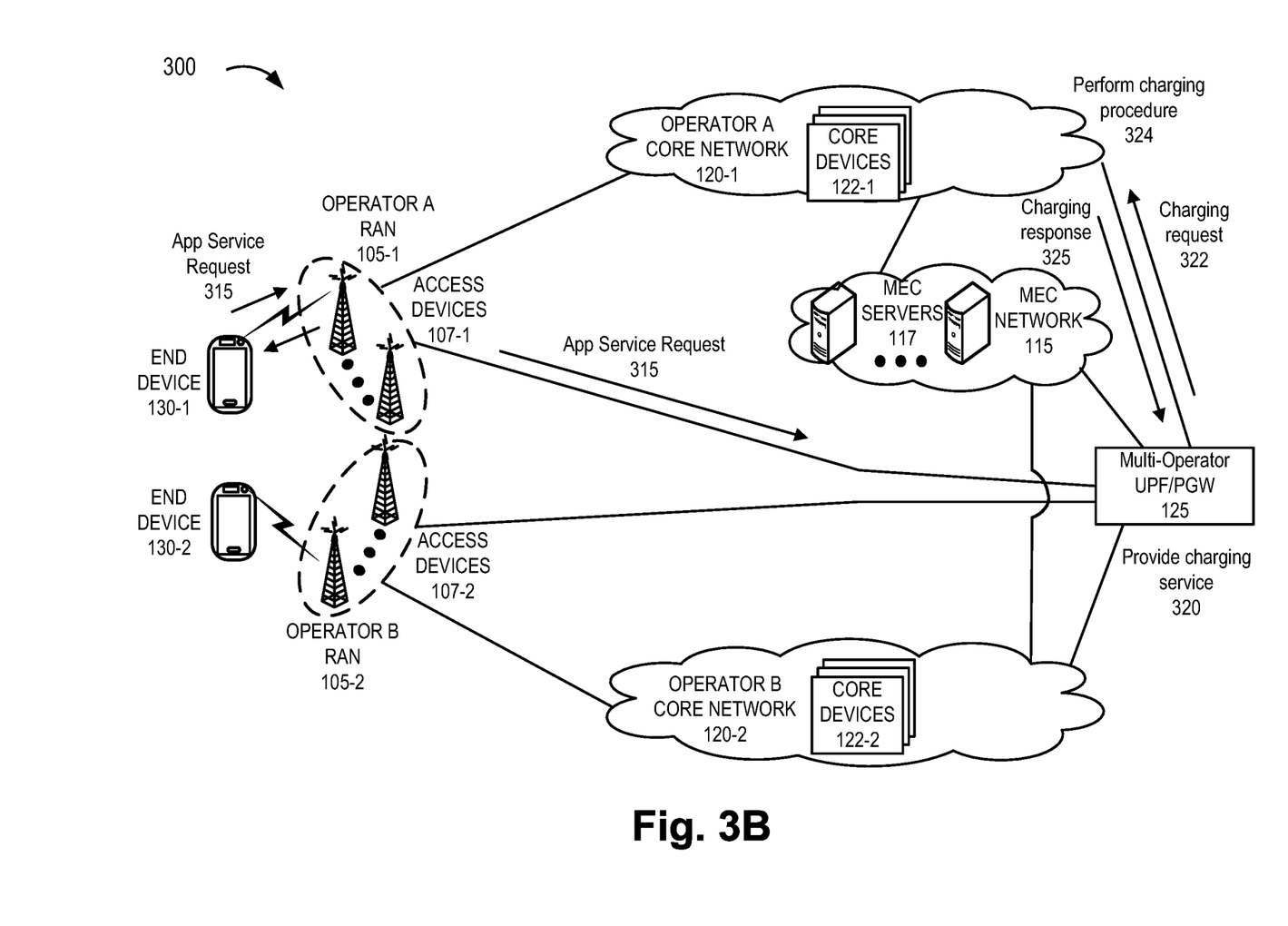

Referring to FIG. 3B, subsequent to registration with and/or attachment to operator A core network 120-1, end device 130-1 may generate and transmit an application service request 315. For example, application service request 315 may be a request for an application service from MEC network 115. According to other examples, application service request 315 may be a request for an application service hosted by another type of external network 115, as described herein. Multi-operator UPF/PGW 125 may receive application service request 315 via access device 107 of operator A RAN 105-1. Multi-operator UPF/PGW 125 may read and interpret application service request 315. Based on the interpretation, according to an exemplary embodiment, multi-operator UPF/PGW 125 may provide a charging service 320.

As previously mentioned, according to some exemplary embodiments, multi-operator UPF/PGW 125 may obtain policy and charging rules for end device 130-1 prior to receiving application service request 315. However, according to other exemplary embodiments, multi-operator UPF/PGW 125 may invoke a charging service procedure to obtain policy and/or charging rules/information in response to receiving application service request 315. Multi-operator UPF/PGW 125 may determine operator A core network 120-1 to be associated with end device 130-1 based on the virtual forwarding and routing service, as described herein. Based on the determination, the charging service procedure may include generating and transmitting a charging request 322 to operator A core network 120-1. Based on receiving charging request 322, operator A core network 120-1 may perform a charging procedure 324. For example, the charging procedure may include a policy control function (PCF) receiving charging request 322 and identifying policy and/or charging rules pertaining to end device 130-1. The charging procedure may include communication with other core devices 122-1, such as an HSS, a UDM, or the like, which may store subscription information pertaining to end device 130-1. As further illustrated, the charging procedure may include generating and transmitting a charging response 325 to multi-operator UPF/PGW 125. Charging response 325 may include a policy, a rule, and/or a monitoring parameter (e.g., a key performance indicator (KPI), amount of data, duration of session, and/or other data session parameters) pertaining to charging and monitoring of a data session, for example.

According to some exemplary scenarios, as a part of performing charging procedure 324, operator A core network 120-1 may provide end device 130-1 with a portal, graphical user interface, or other mechanism for establishing a charging plan, payment (e.g., using credit card), or another type of subscription and/or charging arrangement. For example, when a current subscription or plan associated with end device 130-1, when present, does not cover or permit access and/or use of the requested application service, operator A core network 120-1 may perform these exemplary steps. In some cases, operator A core network 120-1 may deny access to end device 130-1, and may communicate such denial to multi-operator UPF/PGW 125. According to such case, multi-operator UPF/PGW 125 may deny application service request 315. Otherwise, charging response 325 may include information pertaining to the charging arrangement.

Figure 3C:
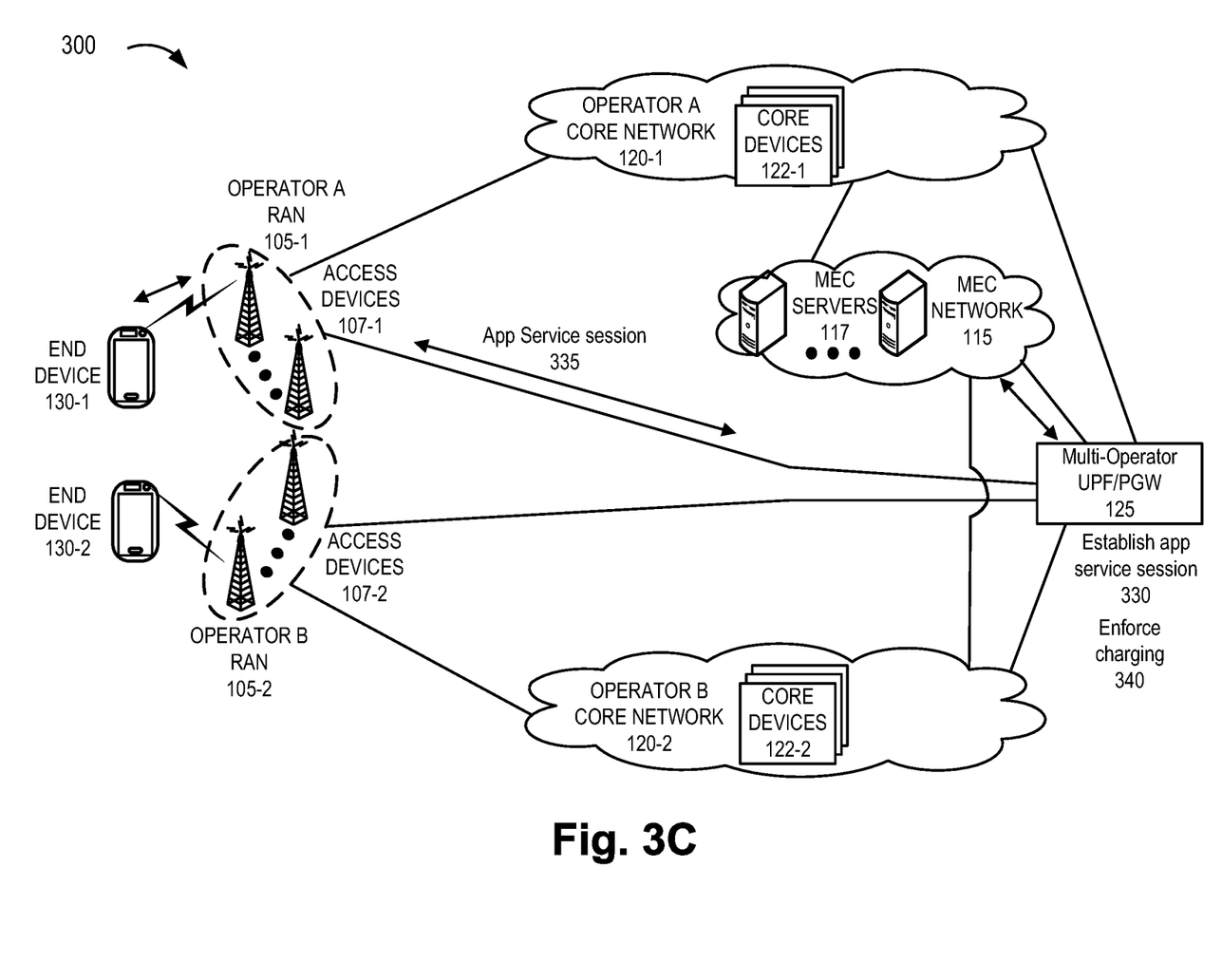

Referring to FIG. 3C, multi-operator UPF/PGW 125 may communicate with MEC network 115 to establish an application service session 330 between end device 130-1 and MEC server 117. Multi-operator UPF/PGW 125 may enforce charging 340 pertaining to the application service session 335. Multi-operator UPF/PGW 125 may monitor and collect data pertaining to the application service session (e.g., KPI, performance metric, quality of service (QoS), amount of data, time period of data session, etc.) based on a requirement from operator A core network 120-1, for example. Multi-operator UPF/PGW 125 may generate charging information (e.g., a charging record) or charging and session information based on the monitoring.

Figure 3D:
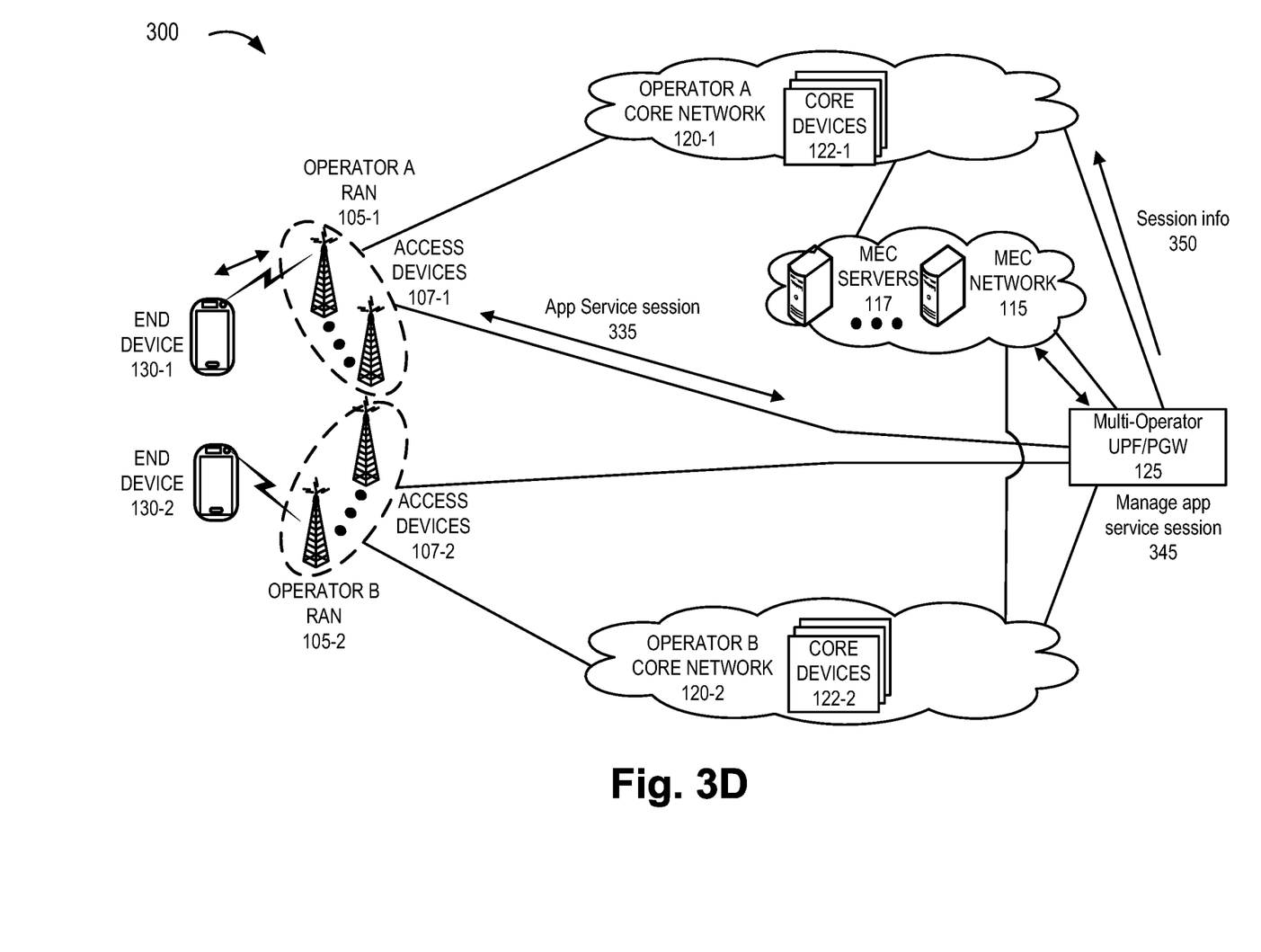
Figure 3E:
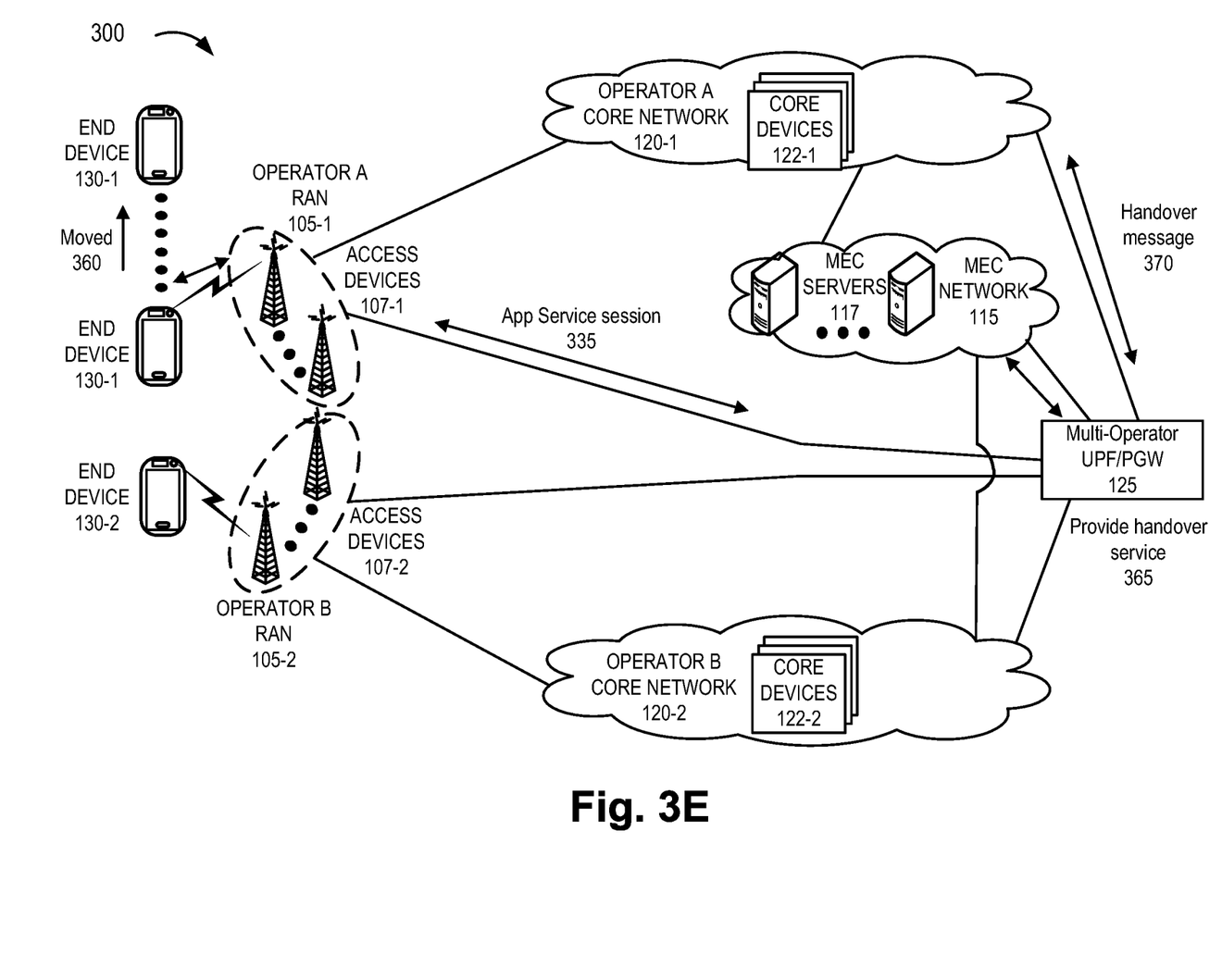

Referring to FIG. 3D, multi-operator UPF/PGW 125 may manage the application service session 345, such as satisfying a performance metric (e.g., latency, bit rate, throughput, error rate, reliability, or other performance indicator) associated with user plane traffic and managing control signaling pertaining to the application service session. As further illustrated, multi-operator UPF/PGW 125 may transmit charging information or charging and session information 350 to operator A core network 120-1. This may occur during the application service session, when the application service session ends, or according to another configuration, for example.

As previously described, according to an exemplary embodiment of the multi-operator anchor service, UPF/PGW 125 may provide a handover service. For example, referring to FIG. 3E, during the application service session 335 end device 130-1 may move 360 to another location in which another access device 107 may provide wireless access service for end device 130-1 or another application layer network (e.g., another MEC network 115) may provide the application service. According to various exemplary embodiments, multi-operator UPF/PGW 125 may perform a handover service 365 to operator A core network 120-1 or another multi-operator UPF/PGW 125 (not illustrated). As a part of a handover procedure, multi-operator UPF/PGW 125 may transmit and receive a handover message 370 that relates to the handover.

FIGS. 3A-3E are diagrams illustrating exemplary processes of the multi-operator anchor service, according to other exemplary embodiments, the multi-operator anchor service may include additional, fewer, and/or different steps. The messages illustrated and described are exemplary.

Figure 4:
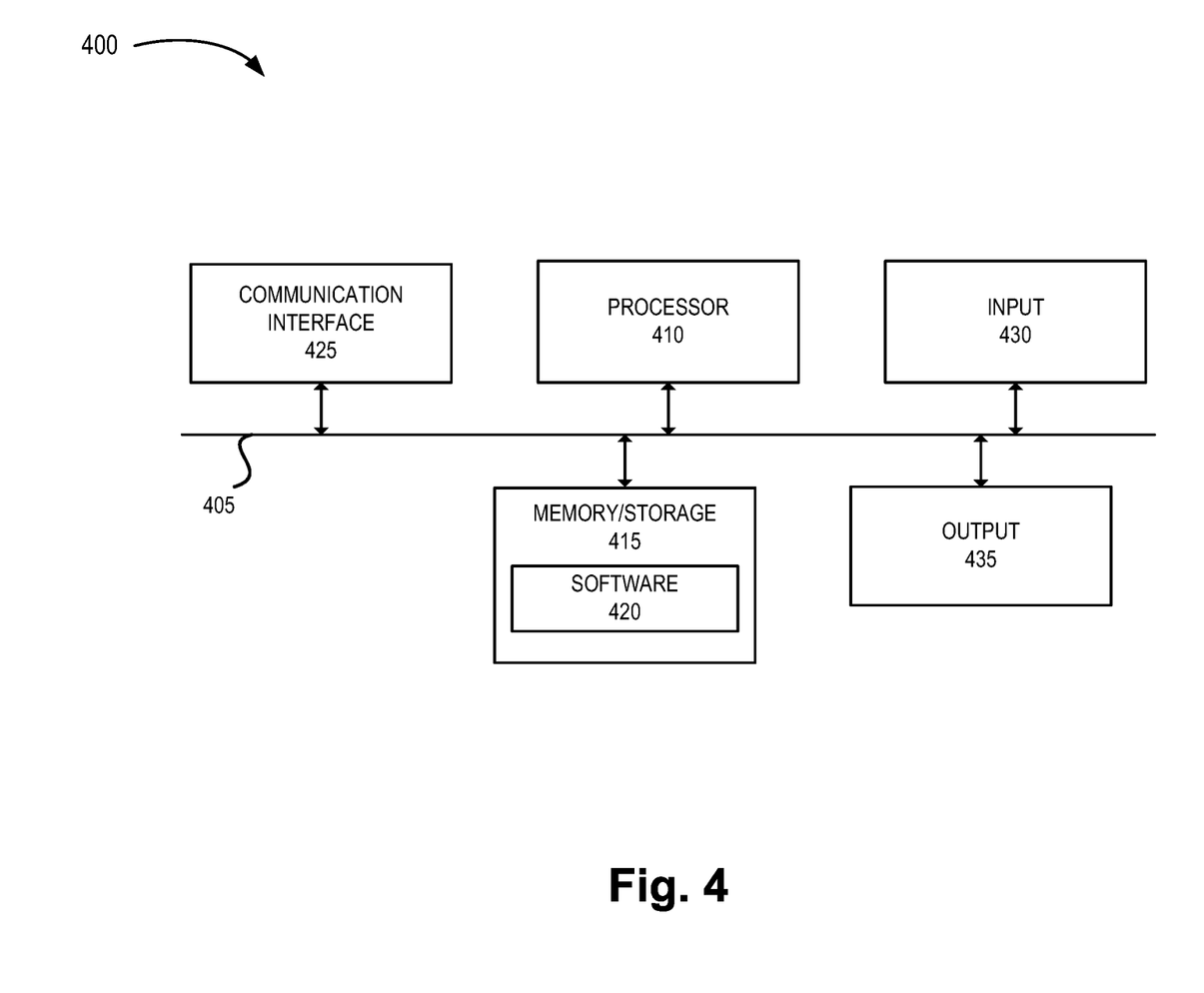
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, multi-operator anchor device/UPF PGW 125, end device 130, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., a cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to multi-operator anchor device 125, software 420 may include an application that, when executed by processor 410, provides a function and/or a process of the multi-operator anchor service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
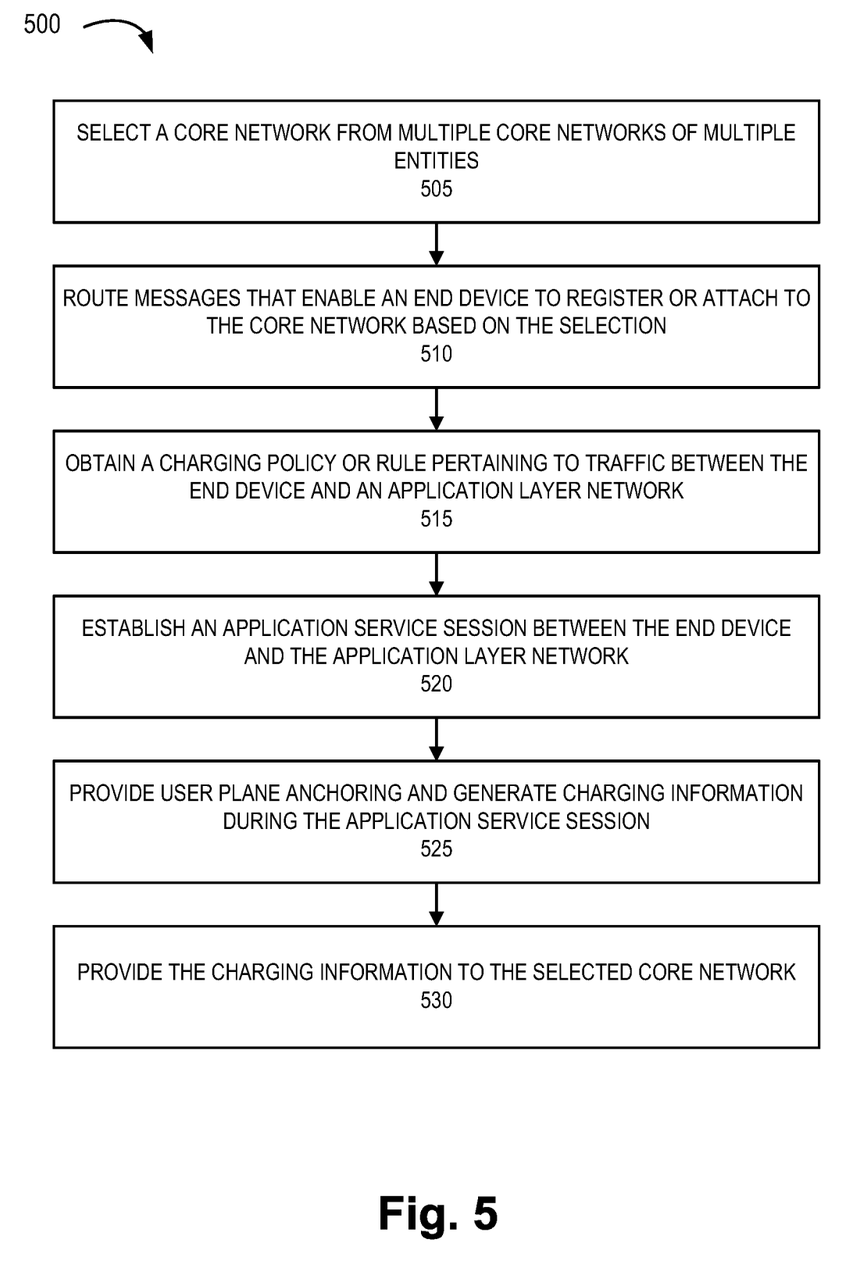
FIG. 5 is a flow diagram illustrating an exemplary process of an exemplary embodiment of the multi-operator anchor service.

FIG. 5 is a flow diagram illustrating an exemplary process 500 of an exemplary embodiment of the multi-operator anchor service. According to an exemplary embodiment, multi-operator anchor device 125 may perform a step of process 500. According to an exemplary implementation, processor 410 executes software 420 to perform the step of process 500, as described herein. Alternatively, the step may be performed by execution of only hardware. According to an exemplary embodiment, multi-operator anchor device 125 may perform process 500 in a multi-operator network environment, as described herein.

In block 505, multi-operator anchor device 125 may select a core network from multiple core networks of multiple entities. For example, multi-operator anchor device 125 may receive a message from end device 130 pertaining to attachment and/or registration with one of the multiple core networks 120. Multi-operator anchor device 125 may select core network 120 associated with end device 130, as described herein.

In block 510, multi-operator anchor device 125 may route messages that enable an end device to register or attach to the core network based on the selection. For example, multi-operator anchor device 125 may route messages between end device 130 and core network 120 associated with an attachment and/or registration procedure.

In block 515, multi-operator anchor device 125 may obtain a charging or policy rule pertaining to traffic between the end device and an application layer network. For example, multiple-operator anchor device 125 may obtain a policy, a rule, and/or other configuration information from core network 120 of end device 130.

In block 520, multi-operator anchor device 125 may establish an application service session between the end device and the application layer network. For example, multi-operator anchor device 125 may establish a data session between end device 130 and external network 115 based on a request from end device 130.

In block 525, multi-operator anchor device 125 may provide user plane anchoring and generate charging information during the application service session based on the charging or policy rule.

In block 530, multi-operator anchor device 125 may provide the charging information to the selected core network 120. Multi-operator anchor device 125 may monitor and provide other types of information to core network 120, as described herein.

FIG. 5 illustrates an exemplary embodiment of a process of the multi-operator anchor service, however according to other exemplary embodiments, the multi-operator anchor service may perform additional operations, fewer operations, and/or different operations than those illustrated and described. For example, multi-operator anchor device 125 may perform steps pertaining to a handover procedure based on the mobility of end device 130, as described herein.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device (e.g., device 400). A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   determining, by a multi-operator network device, one of multiple networks and operators from which to obtain configuration information for charging an end device based on an identifier of the end device included in a message received from the end device during a registration request or an attachment request procedure, wherein the multi-operator network device provides a user plane anchor for traffic of end devices associated with the multiple networks and operators that is external from the multiple networks and operators;

obtaining, by the multi-operator network device from the one of the multiple networks and operators, the configuration information;

establishing, by the multi-operator network device, an application service session between the end device and an application layer network;

monitoring, by the multi-operator network device, traffic of the application service session based on the configuration information;

generating, by the multi-operator network device in response to the monitoring, charging information pertaining to the traffic and at an end device level; and transmitting, by the multi-operator network device to the one of the multiple networks, the charging information.

2. The method of claim 1, further comprising:
selecting, by the multi-operator network device, a route to the one of the multiple networks and operators based on the identifier of the end device.

3. The method of claim 1, wherein the multiple networks include multiple radio access networks and multiple core networks of the multiple operators.

4. The method of claim 1, further comprising:
receiving, by the multi-operator network device from the end device, a request for an application service; and
transmitting, by the multi-operator network device to the one of the multiple networks, the request.

5. The method of claim 1, further comprising:
generating, by the multi-operator network device in response to the monitoring, other data pertaining to the traffic including at least one of a key performance indicator or a performance metric, wherein the transmitting further comprises:
transmitting, by the multi-operator network device to the one of the multiple networks, the other data.

6. The method of claim 1, further comprising:
performing, by the multi-operator network device, a handover of the application service session to the one of the multiple networks or another multi-operator network device based on a mobility of the end device.

7. The method of claim 1, wherein the application layer network is a multi-access computing edge network.

8. The method of claim 1, wherein the multi-operator network device includes at least one of a user plane function or a packet data network gateway.

9. A network device comprising:
a processor configured to:
determine one of multiple networks and operators from which to obtain configuration information for charging an end device based on an identifier of the end device included in a message received from the end device during a registration request or an attachment request procedure, wherein the network device is a multi-operator network device provides a user plane anchor for traffic of end devices associated with the multiple networks and operators that is external from the multiple networks and operators;
obtain the configuration information from the one of the multiple networks and operators for charging the end device;
establish an application service session between the end device and an application layer network;
monitor traffic of the application service session based on the configuration information;
generate in response to the monitoring, charging information pertaining to the traffic and at an end device level; and
transmit to the one of the multiple networks, the charging information.

10. The network device of claim 9, wherein the processor is further configured to:
select a route to the one of the multiple networks and operators based on the identifier of the end device.

11. The network device of claim 9, wherein the multiple networks include multiple radio access networks and multiple core networks of the multiple operators.

12. The network device of claim 9, wherein the processor is further configured to:
receive, from the end device, a request for an application service; and
transmit to the one of the multiple networks, the request.

13. The network device of claim 9, wherein the processor is further configured to:
generate, in response to the monitoring, other data pertaining to the traffic including at least one of a key performance indicator or a performance metric, and wherein the processor is further configured to:
transmit to the one of the multiple networks, the other data.

14. The network device of claim 9, wherein the processor is further configured to:
perform a handover of the application service session to the one of the multiple networks or another multi-operator network device based on a mobility of the end device.

15. The network device of claim 9, wherein the application layer network is a multi-access computing edge network.

16. The network device of claim 9, wherein the multi-operator network device includes at least one of a user plane function or a packet data network gateway.

17. A non-transitory computer-readable storage medium storing instructions executable by a processor of a multi-operator network device, which when executed cause the processor to:
determine one of multiple networks and operators from which to obtain the configuration information for charging the end device based on an identifier of the end device included in a message received from the end device during a registration request or an attachment request procedure, wherein the multi-operator network device provides a user plane anchor for traffic of end devices associated with the multiple networks and operators that is external from the multiple networks and operators;
obtain the configuration information from the one of the multiple networks and operators for charging the end device;
establish an application service session between the end device and an application layer network;
monitor traffic of the application service session based on the configuration information;
generate in response to the monitoring, charging information pertaining to the traffic and at an end device level; and
transmit to the one of the multiple networks, the charging information.

18. The non-transitory computer-readable storage medium of claim 17, wherein the multiple networks include multiple radio access networks and multiple core networks of the multiple operators.

19. The non-transitory computer-readable storage medium of claim 17, wherein the application layer network is a multi-access computing edge network.

20. The non-transitory computer-readable storage medium of claim 17, wherein the instructions when executed cause the processor to:
perform a handover of the application service session to the one of the multiple networks or another multi-operator network device based on a mobility of the end device.

* * * * *